US00RE48840E

(19) United States
(12) Reissued Patent
Kim

(10) Patent Number: US RE48,840 E
(45) Date of Reissued Patent: Dec. 7, 2021

(54) INFANT PACIFIER HOLDER AND TEETHER

(71) Applicant: Byongchul Kim, Miramar, FL (US)

(72) Inventor: Byongchul Kim, Miramar, FL (US)

(21) Appl. No.: 16/413,357

(22) Filed: May 15, 2019

Related U.S. Patent Documents

Reissue of:
(64) Patent No.: 10,258,544
Issued: Apr. 16, 2019
Appl. No.: 15/592,657
Filed: May 11, 2017

U.S. Applications:
(63) Continuation-in-part of application No. 29/564,157, filed on May 11, 2016, now Pat. No. Des. 836,207.

(51) Int. Cl.

| | |
|---|---|
| ***A61J 17/00*** | (2006.01) |
| ***A63H 3/36*** | (2006.01) |
| ***A63H 3/02*** | (2006.01) |
| ***A61J 17/02*** | (2006.01) |
| ***A63H 3/00*** | (2006.01) |

(52) U.S. Cl.
CPC ..... *A63H 3/003* (2013.01); *A61J 17/001* (2015.05); *A61J 17/02* (2013.01); *A61J 17/1111* (2020.05); *A63H 3/02* (2013.01)

(58) Field of Classification Search
CPC . A63H 3/00; A63H 3/003; A63H 3/02; A63H 3/005; A61J 17/00; A61J 17/001; A61J 17/02; A61J 17/105; A61J 17/1111; A61J 17/111; A61J 17/113
See application file for complete search history.

(56) References Cited

U.S. PATENT DOCUMENTS

| | | | | |
|---|---|---|---|---|
| 2,085,704 A * | 6/1937 | Sacks | A61J 17/02 | 606/235 |
| 2,798,482 A * | 7/1957 | Feeney | A61J 17/02 | 128/880 |
| 3,669,117 A * | 6/1972 | Herbst | A61J 17/02 | 606/235 |
| 3,955,314 A * | 5/1976 | Robb | A63H 3/36 | 446/72 |
| 4,277,910 A * | 7/1981 | Kramer | A63H 3/003 | 446/73 |
| 4,577,632 A * | 3/1986 | Grasset | A61J 17/02 | 606/236 |
| 5,334,218 A * | 8/1994 | Johnson | A61J 17/02 | 606/234 |
| 5,344,355 A * | 9/1994 | Silverstein | A63H 3/003 | 446/268 |
| 5,403,349 A * | 4/1995 | Rohrig | A61J 17/001 | 606/234 |
| 5,653,731 A * | 8/1997 | Rohrig | A61J 17/02 | 606/234 |

(Continued)

*Primary Examiner* — Patricia L Engle
(74) *Attorney, Agent, or Firm* — Mark C. Johnson; Johnson Dalal

(57) ABSTRACT

A teething device that is configured to retain a pacifier in a central aperture of the teething device. The teething device has a plurality of lobes at a first end, with the lobes having a plurality of nubs for teething. The aperture and latch are configured to universally retain the edges of a pacifier shield or handle such that the nipple of the pacifier may be presented to a child utilizing the device. The device may also include a plush toy attached to an attachment ledge of the teething device. The plush toy includes an internal pocket for storing a pacifier.

20 Claims, 4 Drawing Sheets

(56) References Cited

U.S. PATENT DOCUMENTS 5,993,285 A * 11/1999 Sofia ..... A63H 3/14 446/26
6,056,774 A * 5/2000 Johansen ..... A61J 17/02 606/234
6,461,214 B1 * 10/2002 Lynch ..... A61J 17/007 446/227
6,666,740 B1 * 12/2003 Schneider ..... A63H 3/003 446/369
6,827,317 B1 * 12/2004 Maki Risaliti ..... A63H 3/003 248/102
6,905,507 B2 * 6/2005 Hinshaw ..... A61J 17/02 606/235
8,444,675 B2 * 5/2013 Minoguchi ..... A61J 17/002 606/235
9,744,103 B1 * 8/2017 Ricker ..... A61J 17/02
9,744,104 B1 * 8/2017 Weston ..... A61J 17/02
2002/0187719 A1 * 12/2002 Schneider ..... A63H 3/02 446/72
2005/0080456 A1 * 4/2005 Sanbrook ..... A61J 17/02 606/235
2005/0217159 A1 * 10/2005 Leung ..... A47G 1/0616 40/725
2006/0226044 A1 * 10/2006 Lobl ..... A61J 17/113 206/438
2008/0090490 A1 * 4/2008 Barrows ..... A63H 3/02 446/369
2008/0255614 A1 * 10/2008 Menoudakos ..... A47G 21/00 606/235
2009/0005810 A1 * 1/2009 Bonazza ..... A61J 17/02 606/235
2009/0030455 A1 * 1/2009 Dallman ..... A61J 17/007 606/236
2009/0081921 A1 * 3/2009 Urueta ..... A63H 3/005 446/369
2009/0287247 A1 * 11/2009 Chipperson ..... A61J 17/02 606/235
2010/0234887 A1 * 9/2010 Smith ..... A61J 17/1111 606/236
2011/0024599 A1 * 2/2011 Finell ..... A61J 17/00 248/523
2011/0184460 A1 * 7/2011 Hakim ..... A61J 17/02 606/234
2011/0224730 A1 * 9/2011 Holley ..... A61J 17/007 606/236
2012/0041487 A1 * 2/2012 Griffis ..... A45F 5/02 606/234
2012/0053631 A1 * 3/2012 David ..... A61J 17/008 606/234
2012/0083842 A1 * 4/2012 Barton ..... A61J 17/02 606/235
2012/0290007 A1 * 11/2012 Rohrig ..... A61J 17/02 606/235
2014/0243895 A1 * 8/2014 Kellogg ..... A61J 17/02 606/235
2015/0051646 A1 * 2/2015 Chan ..... A45F 5/02 606/236
2015/0209240 A1 * 7/2015 Steward ..... A61J 17/02 606/235
2016/0106631 A1 * 4/2016 Rohrig ..... A61J 17/007 606/235
2016/0199264 A1 * 7/2016 McClintock ..... A63J 17/00 446/73
2016/0236103 A1 * 8/2016 Pettrey, III ..... A63H 3/003
2017/0151504 A1 * 6/2017 Villano ..... A63H 3/003
2017/0304155 A1 * 10/2017 Leung ..... A61H 13/00
2018/0078866 A1 * 3/2018 Rogone ..... A63H 3/003
2018/0214350 A1 * 8/2018 Schneider ..... A61J 17/007

* cited by examiner

FIG.1
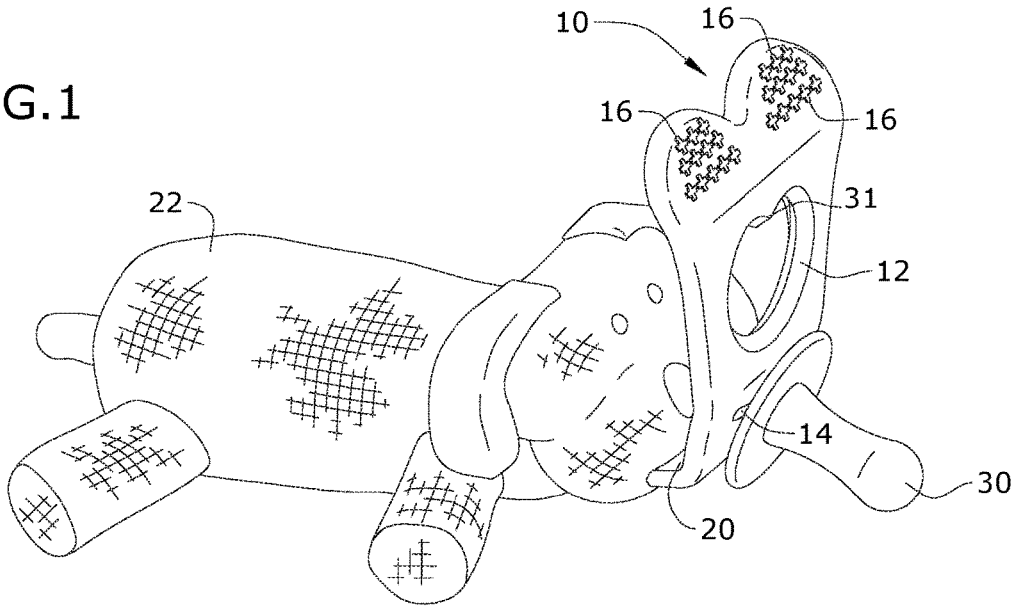
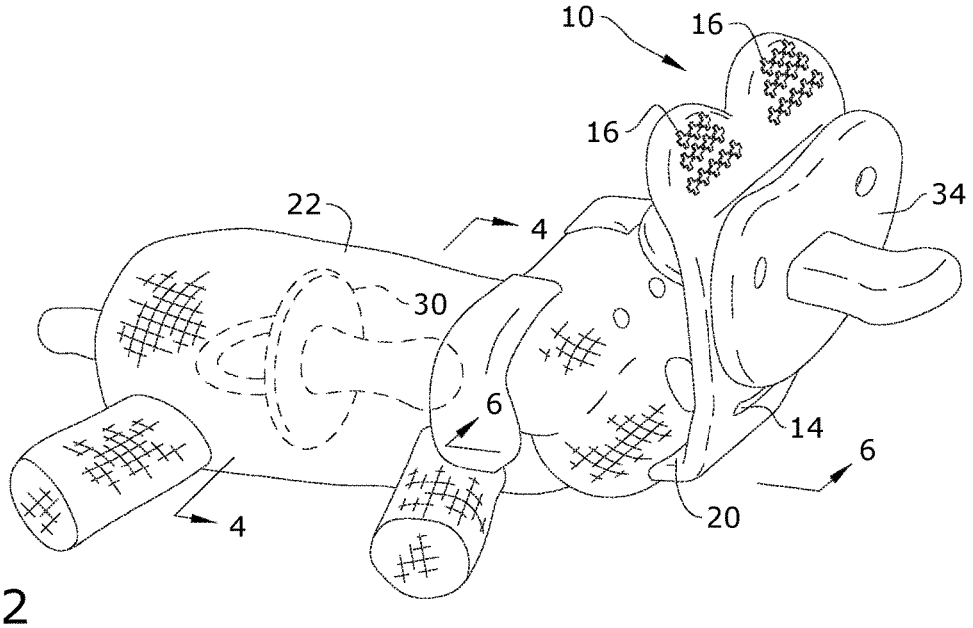
FIG.2

FIG.3
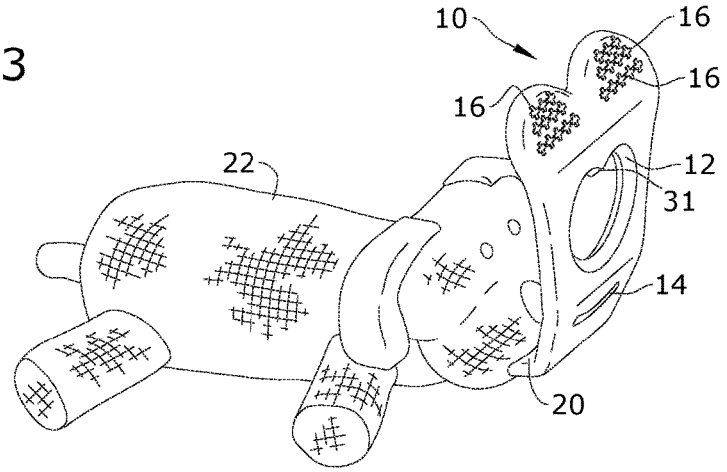
FIG.4
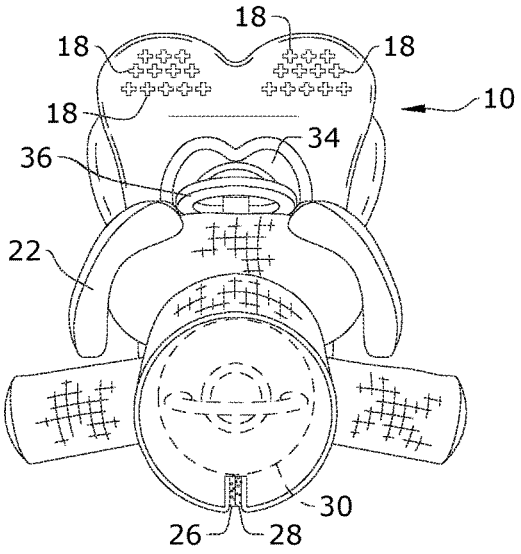
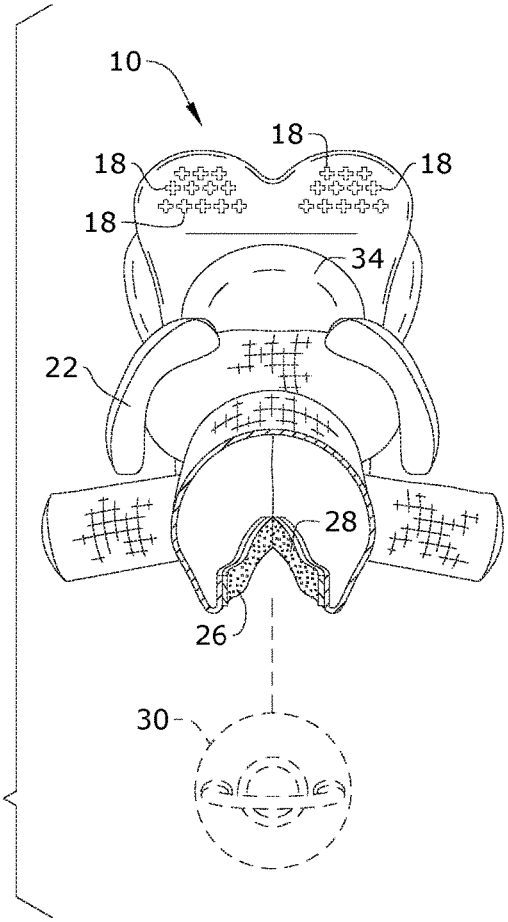
FIG.5

FIG.8
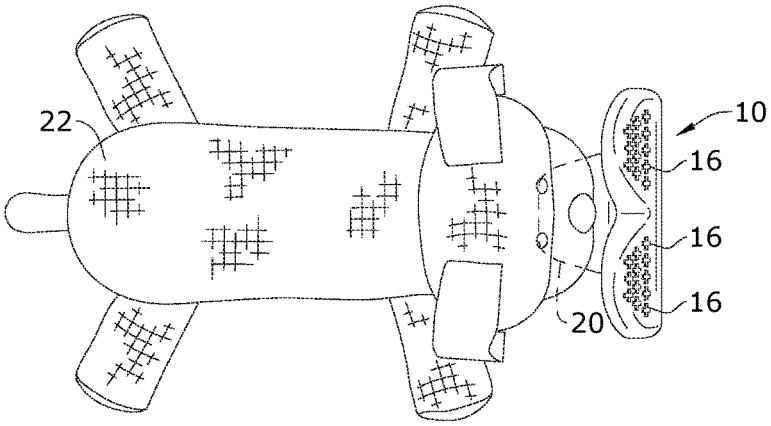
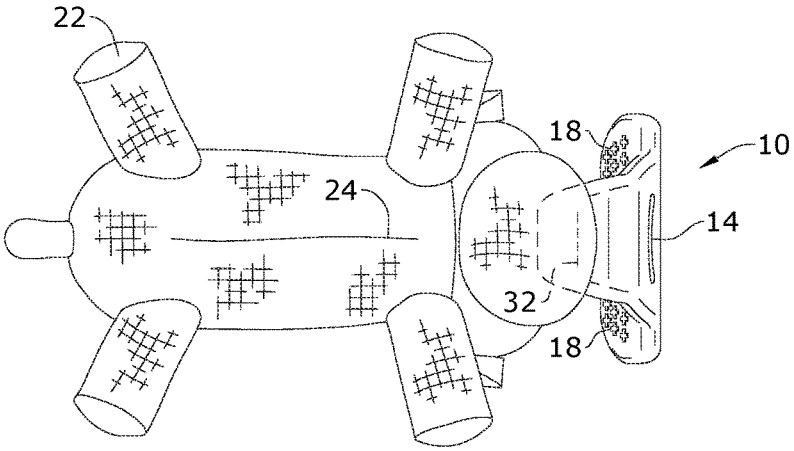
FIG.9
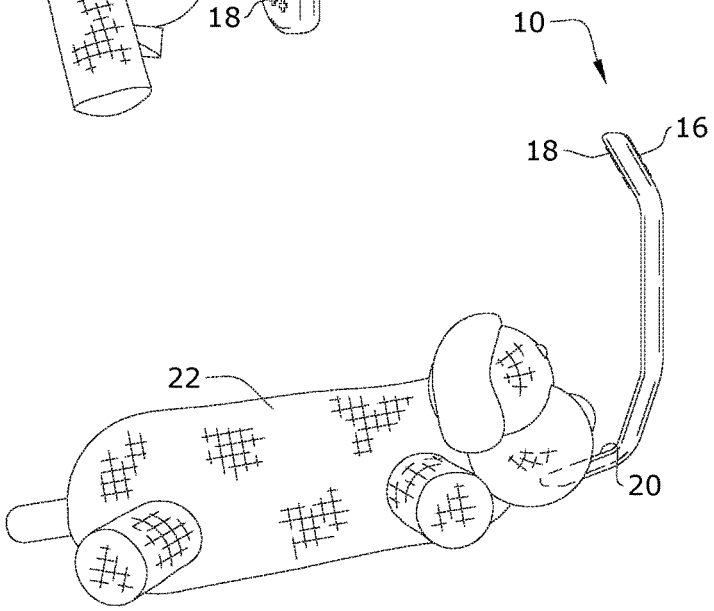
FIG.10

INFANT PACIFIER HOLDER AND TEETHER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application is a continuation in part of U.S. design patent application Ser. No. 29/564,157, filed May 11, 2016, the contents of which are herein incorporated by reference.]

*This application is a reissue of U.S. Nonprovisional patent application Ser. No. 15/592,657, now patented in U.S. Pat. No. 10,258,544 issued on Apr. 16, 2019, which is a continuation in part of U.S. design patent application Ser. No. 29/564,157, filed May 11, 2016, the contents of which are herein incorporated by reference.*

BACKGROUND OF THE INVENTION

The present invention relates to infant care products and, more particularly, to teething devices.

Currently in the art, parents of infants and small children are provided with a wide variety of teething devices, which facilitate the soothing of the child's gums when its teeth begin to emerge. There are also a variety of pacifiers available for parents to choose from. The pacifiers are also intended to sooth the child when they become restless or irritable.

These devices can be difficult for a parent to locate and may be easily lost, particularly where the child may drop them or spit them out when the parent is not observing the child. Similarly, their relatively small size permits them to become lost under furniture, in seat cushions, bedding, and the like.

Moreover, these items typically are discrete devices and are not usually combined. Accordingly, a parent or caregiver is required to track the location of these separate, readily losable items. When a child has an urge for either item, their level of distress and crying may be exacerbated if the parent or caregiver is unable to quickly locate the items.

As can be seen, there is a need for an improved teether and pacifier configuration that avoids the loss or temporary misplacement of these items.

SUMMARY OF THE INVENTION

In one aspect of the present invention, a teether and pacifier holder, includes an elongate body having a teething end and an attachment ledge extending at a reverse angle with respect to a front face of a retainer portion interposed between the teething end and the attachment ledge. A plurality of rounded lobes extend from the teething end and are dimensioned to fit within a child's mouth opening. A plurality of protruding teething elements extend from one or more surfaces of the lobes. An aperture is defined through the elongate body, having a generally rounded shape, with a protruding latch that extends into an interior of the aperture. The aperture may also include an inwardly converging sidewall that converges from a back surface of to the front face.

The teether and pacifier holder may have a slot extending through the retainer portion. The slot is configured to receive a tab handle portion extending from a back surface of a pacifier shield. A plush toy may be operatively connected to the attachment ledge by a fastener.

The aperture is dimensioned to prevent the passage of a shield of a pacifier through the aperture. The latch is configured to retain a top edge of the pacifier shield subjacent to the latch while a lateral and a bottom edge of the pacifier shield is held in abutment against the a back face of the elongate body.

The teether and pacifier holder may also include a pacifier retained in the aperture. Alternatively, a tab handle of a pacifier may be retained in the slot.

These and other features, aspects and advantages of the present invention will become better understood with reference to the following drawings, description and claims.

BRIEF DESCRIPTION OF THE DRAWINGS

FIG. 1 is a perspective view of an embodiment of a teether and pacifier holder shown in use holding a ring handle type pacifier;

FIG. 2 is a perspective view of the teether and pacifier holder in use holding a tab type handle pacifier;

FIG. 3 is a perspective view of the teether and pacifier holder;

FIG. 4 is a section view of the teether and pacifier holder taken from 4-4 in FIG. 2 illustrating a pacifier carried in an internal storage pocket of the plush toy;

FIG. 5 is a section view illustrating the internal storage pocket in an open condition;

FIG. 8 is a top plan view of the teether and pacifier holder;

FIG. 9 is a bottom plan view of the teether and pacifier holder; and

FIG. 10 Is a side elevation view of the teether and pacifier holder.

DETAILED DESCRIPTION OF THE INVENTION

Figure 6:
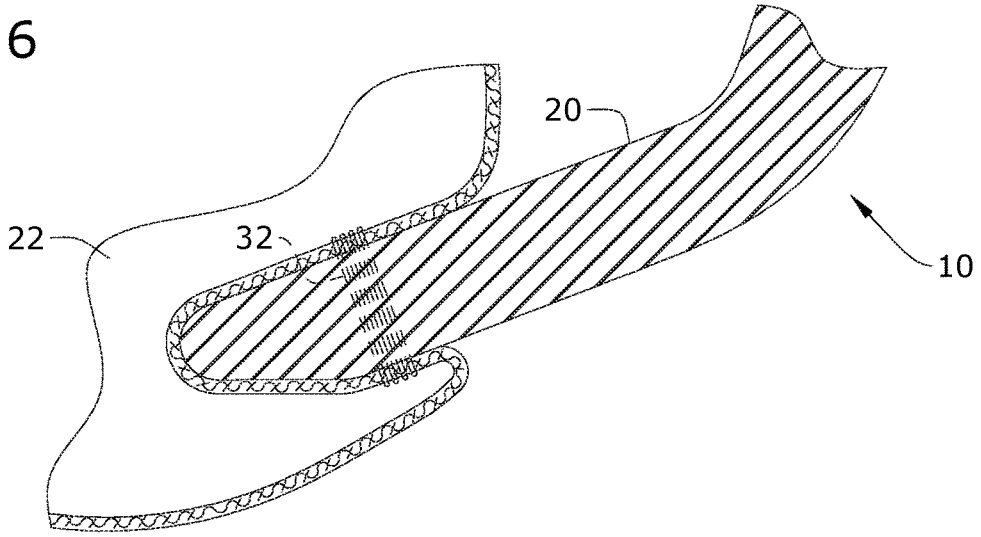
FIG. 6 is a section view of the invention taken from 6-6 in FIG. 2.
Figure 7:
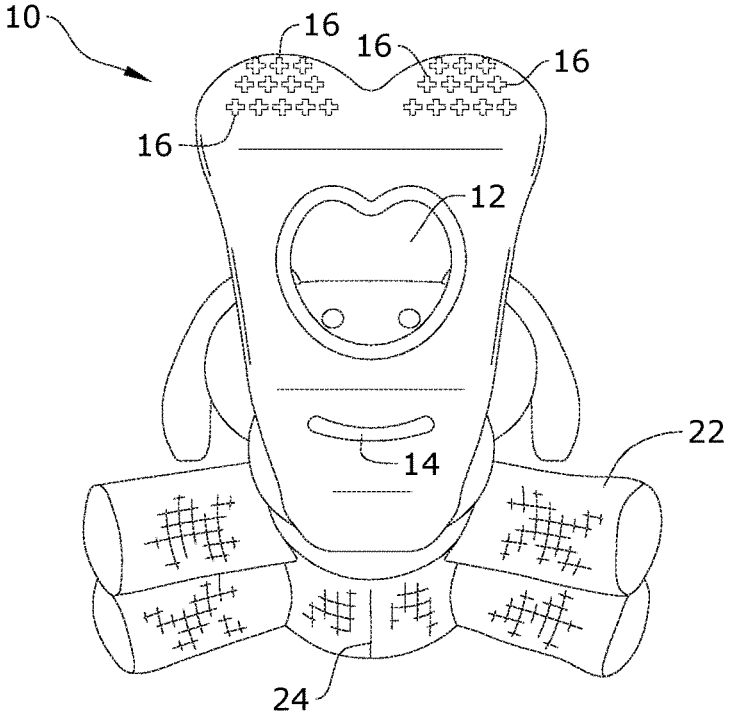
FIG. 7 is a front elevation view of the teether and pacifier holder.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved teether for an infant or small child that also is configured to retain a pacifier. To facilitate the parent's ability to locate the tether and pacifier carried by the teether, the teether and pacifier holder may also be configured with a plush toy attached to the teether holder. The plush toy may have an internal storage pocket to carry a spare pacifier, when not in use by the child.

As shown in reference to the FIGS. 1-10, the teether and pacifier holder 10 may be formed as an elongate body having a teething end and an attachment ledge 20—at the opposite end. The teething end and attachment ledge 20 extend at a reverse angle with respect with the front face of an intermediate retainer portion interposed between the ends. As will be appreciated, the teether and pacifier holder 10 may be formed of a child safe silicone material, preferably one that is resilient and pliable.

The teething end has a plurality of rounded lobes dimensioned to fit within the child's mouth opening. A plurality of protruding teething elements 16, such as ribs, nubs, and the like extend from a front surface of the lobes. Likewise, a plurality of protruding teething elements 18, may extend from a back surface of the lobes. The teething elements 16, 18 provide the child with a massaging portion to sooth their gums while teething.

The retainer portion has a substantially flat surface and an aperture 12 defined through the retainer portion of the teether holder 10. The retainer portion may also be configured with an arcuate slot 14. As shown in reference to FIG. 1, the slot 14 is configured to receive a tab type handle extending from a back surface of the pacifier shield 34 of some styles of pacifiers, such as a Phillips AVENT Soothie, 190/01 manufactured by Koninklijke Philips N.V.

The aperture 12 is generally rounded in shape and is configured to receive the nipple of a pacifier 30 there through. A protruding latch 31 extends into an interior of the aperture 12 and is configured retain a shield 34 or handle element 36 of the pacifier 30. The aperture 12 may also be provided with inwardly converging sidewall that converges from the back surface of the teether and pacifier holder body to the front surface of the teether body. The aperture 12 and latch 31 are dimensioned for nearly universal holding of a pacifier having a ring type handle 36 extending from the back of the pacifier 30.

The aperture 12 and the inwardly converging sidewalls are dimensioned to prevent the passage of the pacifier shield 34 through the aperture 12, while the protruding latch 31 is configured such that a top edge of the pacifier shield 34 or handle 36 is tucked under the protruding latch 31 to retain the pacifier within the teether and pacifier holder 10.

As best seen in reference to FIG. 6, the attachment ledge 20 is utilized to attach the teether holder 10 to a plush toy 22, via a fastener 32, such as stitching. As best seen in reference to FIGS. 4, 5, and 9, the plush toy 22 may have an internal pocket 24 for holding a pacifier internal to the plush toy 22. The internal pocket 24 may be selectively opened by a cooperating fastener, such as hook 26 and pile 28 fasteners, a slide fastener, a zipper, or a button closure.

When attached to the plush toy 22, the lobes carrying the teething elements 16, 18 are angled rearwardly towards the plush toy 22, which in conjunction with the angular deflection of the attachment ledge 20, positions the teething elements 16, 18 so that the child may teethe while holding the plush toy. Similarly, the angular deflection of the attachment ledge 20 permits the pacifier to be presented at a convenient angle while the child is holding the plush toy 22.

It should be understood, of course, that the foregoing relates to exemplary embodiments of the invention and that modifications may be made without departing from the spirit and scope of the invention as set forth in the following claims.

What is claimed is:

1. A pacifier holder and teether, comprising:

an elongate body having a teething end and an attachment ledge each extending at a reverse angle with respect to a front face of the elongate body with a retainer portion interposed between the teething end and the attachment ledge;

a plurality of rounded lobes extending from the teething end dimensioned to fit within a child's mouth opening;

a plurality of protruding teething elements extending from one or more surfaces of the plurality of rounded lobes; and an aperture defined through the elongate body, having a generally rounded shape, with a protruding latch that extends into an interior of the aperture.

2. The pacifier holder and teether of claim 1, further comprising:

an inwardly converging sidewall of the aperture that converges from a back surface of the elongate body to the front face.

3. The pacifier holder and teether of claim 1, further comprising:

a slot extending through the retainer portion.

4. The pacifier holder and teether of claim 3, wherein the slot is configured to receive a tab handle of a pacifier received in the slot.

5. The pacifier holder and teether of claim 3, further comprising:

a plush toy operatively connected to the attachment ledge via a fastener.

6. The pacifier holder and teether of claim 5, wherein the fastener is a stitch.

7. The pacifier holder and teether of claim 6, further comprising:

an internal storage pouch defined within the plush toy.

8. The pacifier holder and teether of claim 7, further comprising:

a fastener operable to selectively open or close the internal storage pouch.

9. The pacifier holder and teether of claim 1, wherein the aperture is dimensioned to prevent the passage of a shield of a pacifier through the aperture.

10. The pacifier holder and teether of claim 9, wherein the latch is configured to retain a top edge of the pacifier shield subjacent to the latch, while a lateral and a bottom edge of the pacifier shield are held in abutment against a [back] *front* face of the elongate body.

11. The pacifier holder and teether of claim [10 further comprising] *1, wherein*:

*the latch is configured to retain a top edge of the pacifier shield subjacent to the latch, while* a pacifier *is* retained in the aperture.

12. The pacifier holder and teether of claim 9, wherein the aperture is dimensioned to retain a handle of a pacifier.

*13. A pacifier holder and teether comprising:*

*a plush toy; and*

*an elongate body having:*

*a distal end and an end of an attachment ledge, opposite the distal end, operatively connected to a front the plush toy via a fastener; and*

*a front face with a retainer portion of a selectively pliable and resilient polymeric material and having two opposing lateral side edges, interposed between the distal end and the end of the attachment ledge, and defining an enclosed arcuate slot centrally disposed between the two opposing lateral side edges of the retainer portion, centrally aligned with the plush toy, and operably configured to receive and retain, with the retainer portion of the elongate body defining the enclosed arcuate slot, a tab handle extending from a back surface of a pacifier shield, the retainer portion having an enclosed aperture defined through the elongate body, having a generally rounded shape, and having an inwardly converging sidewall defining a protruding latch that extends into an interior of the enclosed aperture.*

*14. The pacifier holder and teether according to claim 13, wherein:*

*the enclosed aperture is interposed between the distal end and the enclosed arcuate slot, the enclosed aperture operably configured to receive and retain, with the retainer portion of the elongate body defining the enclosed aperture, a handle element of a pacifier.*

*15. The pacifier holder and teether according to claim 13, wherein:*

*the distal end is a teething end, the teething end and an attachment ledge each extending at a reverse angle with respect to the front face of the elongate body; and*

*the front face of the retainer portion defining the enclosed arcuate slot is substantially flat.*

*16. The pacifier holder and teether according to claim 15, further comprising:*

*a plurality of rounded lobes extending from the teething end dimensioned to fit within a child's mouth opening; and*

*a plurality of protruding teething elements extending from one or more surfaces of the plurality of rounded lobes.*

*17. A pacifier holder and teether comprising:*

*a plush toy; and*

*an elongate body having:*

*a distal end and an end of an attachment ledge, opposite the distal end, operatively connected to the plush toy via a fastener; and*

*a front face with a retainer portion of a selectively pliable and resilient polymeric material, interposed between the distal end and the end of the attachment ledge, the retainer portion of the elongate body defining an:*

*enclosed aperture defined through the elongate body and having a generally rounded shape; and*

*enclosed arcuate slot operably configured to receive and retain, with the retainer portion of the elongate body defining the enclosed arcuate slot, a tab handle extending from a back surface of a pacifier shield, the enclosed arcuate slot is interposed between the end of the attachment ledge and the enclosed aperture and the retainer portion of the elongate body with an inwardly converging sidewall defining a protruding latch that converges to a point that extends into and is disposed within an interior of the enclosed aperture, the enclosed aperture operably configured to receive and retain, with the protruding latch and retainer portion of the elongate body defining the enclosed aperture, a handle element of a pacifier.*

*18. The pacifier holder and teether according to claim 17, wherein:*

*the distal end is a teething end, the teething end and an attachment ledge each extending at a reverse angle with respect to the front face of the elongate body, the elongate body having a plurality of rounded lobes extending from the teething end dimensioned to fit within a child's mouth opening and having a plurality of protruding teething elements extending from one or more surfaces of the plurality of rounded lobes.*

*19. A pacifier holder and teether comprising:*

*a plush toy; and*

*an elongate body having:*

*a distal end that is a teething end;*

*an end of an attachment ledge, opposite the distal end, operatively connected to a front the plush toy via a fastener, the teething end and an attachment ledge each extending at a reverse angle with respect to the front face of the elongate body; and*

*a front face with a retainer portion of a selectively pliable and resilient polymeric material and having two opposing lateral side edges, interposed between the distal end and the end of the attachment ledge, and defining an enclosed arcuate slot centrally disposed between the two opposing lateral side edges of the retainer portion, centrally aligned with the plush toy, and operably configured to receive and retain, with the retainer portion of the elongate body defining the enclosed arcuate slot, a tab handle extending from a back surface of a pacifier shield, wherein the front face of the retainer portion defining the enclosed arcuate slot is substantially flat.*

*20. A pacifier holder and teether comprising:*

*a plush toy; and*

*an elongate body having:*

*a distal end that is a teething end;*

*an end of an attachment ledge, opposite the distal end, operatively connected to the plush toy via a fastener; and*

*a front face with a retainer portion of a selectively pliable and resilient polymeric material, interposed between the distal end and the end of the attachment ledge, wherein the teething end and the attachment ledge each extending at a reverse angle with respect to the front face of the elongate body, the retainer portion of the elongate body defining an enclosed aperture defined through the elongate body and having a generally rounded shape and with an inwardly converging sidewall defining a protruding latch that converges to a point that extends into and is disposed within an interior of the enclosed aperture, the elongate body having a plurality of rounded lobes extending from the teething end dimensioned to fit within a child's mouth opening and having a plurality of protruding teething elements extending from one or more surfaces of the plurality of rounded lobes, and with the enclosed aperture operably configured to receive and retain, with the protruding latch and retainer portion of the elongate body defining the enclosed aperture, a handle element of a pacifier.*

* * * * *